Feb. 3, 1925.
L. H. ROGERS
MACHINE FOR FACING VALVE SEATS
Filed July 11, 1924
1,525,202
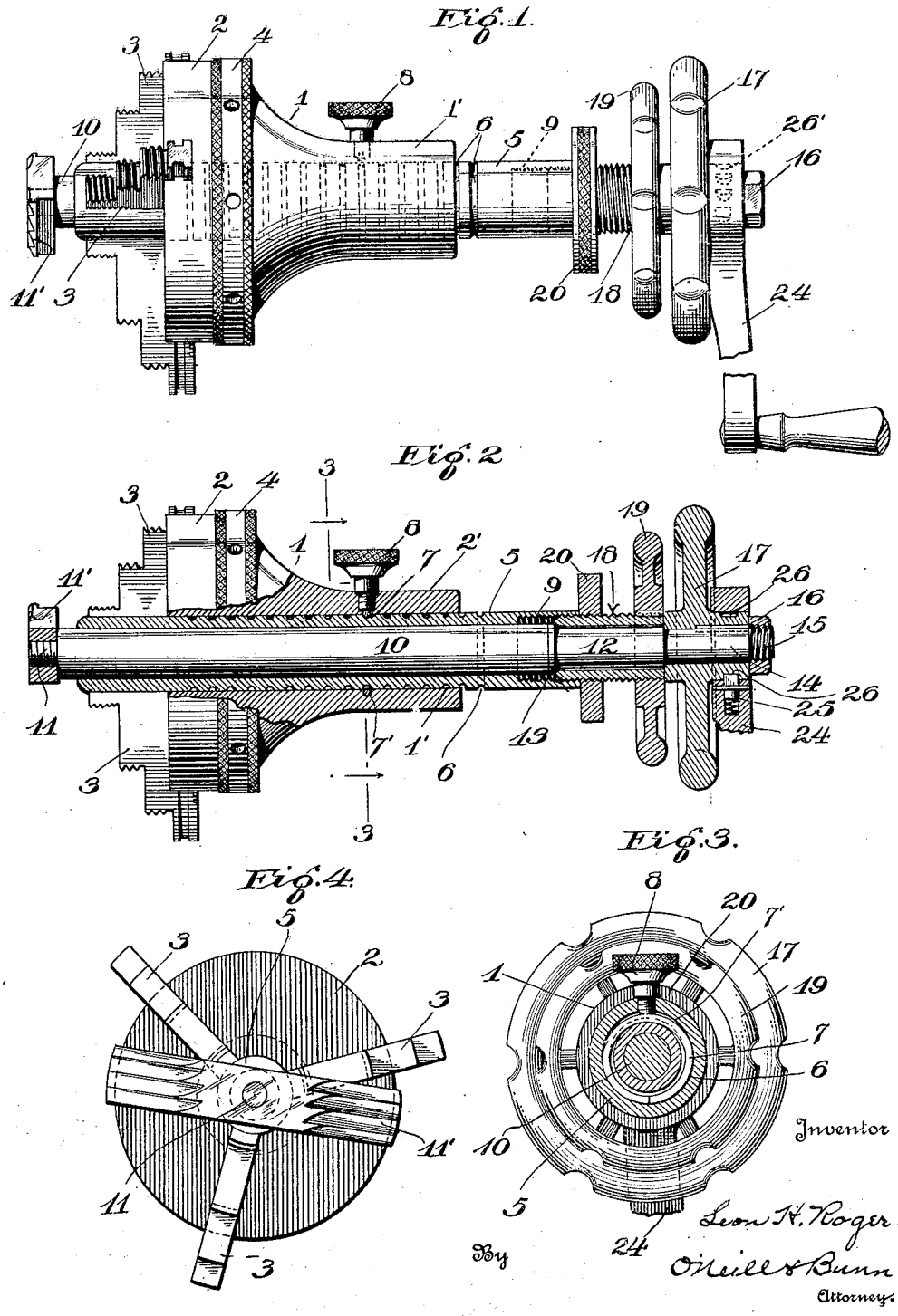

Patented Feb. 3, 1925.

1,525,202

UNITED STATES PATENT OFFICE.

LEON H. ROGERS, OF ORANGE, MASSACHUSETTS, ASSIGNOR TO THE LEAVITT MACHINE COMPANY, OF ORANGE, MASSACHUSETTS.

MACHINE FOR FACING VALVE SEATS.

Application filed July 11, 1924. Serial No. 725,514.

*To all whom it may concern:*

Be it known that I, LEON H. ROGERS, a citizen of the United States, residing at Orange, in the county of Franklin and State of Massachusetts, have invented certain new and useful Improvements in Machines for Facing Valve Seats; and I do hereby declare the following to be a full, clear, and exact description of the invention, such as will enable others skilled in the art to which it appertains to make and use the same.

The invention relates to a tool or machine for recutting or resurfacing the seats of valves and has for its object to provide a simple, strong and efficient tool of the character indicated in which the tool spindle will be supported throughout its entire length in proper relation to the valve seat to be ground, in which the device may be readily adjusted to valves of different sizes and in which the tool spindle may be readily adjusted within its support for bringing the tool into preliminary engagement with the valve seat, the adjusting means being then locked so that the normal feed of the tool spindle toward the work may be effected by means provided for that purpose. To these ends, the invention comprises a support including means for securing the tool to valve casings of various sizes, said support having an axial bore in which a bearing sleeve is slidably mounted, the supporting sleeve having cooperating locking means to secure the sleeve in proper adjusted relation in accordance with the size and character of the valve having a seat to be faced, a tool spindle rotatably and longitudinally slidable within the bearing sleeve, means interposed between the spindle and the sleeve for effecting the feeding adjustment of the spindle relatively to the work, and means for rotating the spindle.

The invention is illustrated in the accompanying drawings, in which:

Fig. 1 is an elevation of the device;

Fig. 2 is a similar view showing parts of the apparatus in longitudinal section;

Fig. 3 is a cross section on the line 3—3 of Fig. 2; and

Fig. 4 is a bottom plan view.

Referring to the drawings, 1 indicates the base or support of the machine including a generally cylindrical base portion 2 and an elongated tapering neck 2', the base portion being provided with radially adjustable stepped jaws or chuck members 3, which are adjusted toward and from the longitudinal axis of the base portions by means of the usual ring 4 which is rotatably mounted on the base portion 2. The support is provided with a central longitudinal bore 1' extending therethrough. These elements of the device are common and well known in apparatus of this general character and constitute the means for securing the tool in proper relation on the valve casing after the bonnet or cap has been removed from the latter, the jaws 3 being engaged either exteriorly or interiorly of the valve casing, and set up in clamping relation to secure the support rigidly in position by operating the ring 4, as will be understood. To engage the jaws 3 with the exterior of the valve casing, said jaws are adjusted outwardly until their inner faces will pass over and embrace the upper portion of the valve casing, after which the jaws are retracted, by turning ring 4, until the serrated inner faces of the jaws are clamped against the outer wall of the valve casing.

Associated with the longitudinal bore of the support 1 is a locking device, preferably in the form of a spring ring 7, which normally lies wholly within an annular groove 7' formed in the face of the bore, a portion of which ring is adapted to be projected beyond the surface of the bore by means of a set screw 8 tapped into the side of the support, the end of which set screw is adapted to engage the outer periphery of the spring ring and deform the same sufficiently to cause the inner face of the ring to extend beyond the groove.

Slidably mounted in the bore 1' of the support 1 is a bearing sleeve 5, the outer surface of which is provided with a series of recesses, arranged in longitudinal order, which are adapted to be separately engaged by the locking device carried by the support 1 to lock the sleeve securely against longitudinal movement within the support, but to permit ready adjustment of the sleeve longitudinally of the support when the locking device is released. In the preferred form of the device, the recesses in the exterior surface of the sleeve take the form of a series of annular grooves spaced in longitudinal order, as shown, and which permit a relatively wide range of adjustment between the support 1 and the sleeve. The upper end of the sleeve is provided with an enlarged bore or recess 9 which is screw threaded on its interior, as shown more particularly in Fig. 2.

Slidably and rotatably mounted within the sleeve 5 is a tool spindle 10 which projects beyond both ends of the sleeve and is provided on its one end with a screw threaded pin 11 adapted to receive a facing tool or cutter 11' of any standard or preferred form, and which, in the particular exemplification of the invention, is a flat bar provided with a series of knives or cutting edges on opposite sides of the center thereof. The other or upper end of the spindle is provided with a reduced section 12 which forms with the body of the spindle an annular shoulder 13 and the extreme upper end of the spindle is still further reduced, as at 14, to receive a hand wheel 17 which is preferably splined to the end of the spindle and is locked against longitudinal movement by means of a nut 16 engaging the threaded end 15 of the spindle.

Mounted for rotary movement on the reduced section 12 of the spindle, and held against longitudinal movement between the shoulder 13 and the lower face of the hub of the hand wheel 17 is a feed sleeve 18, which is exteriorly screw threaded to engage the threaded recess 9 in the upper end of the bearing sleeve 5, said feed sleeve having a hand wheel 19 splined to its upper end and being provided with an adjustable set nut 20 engaging the threaded surface thereof and adapted to be set up against the upper end of the sleeve 5 to prevent accidental operation of the feed sleeve and hold the latter in its adjusted relation.

If desired, the hand wheel 17 may be provided with additional means for rotating the same and the tool spindle when the valve seat to be refaced is of hard metal and, therefore, requires considerable power to be applied to the tool. This additional operating means may take the form of a crank 24 adapted to be slipped over the upper portion of the hub of the hand wheel 17 and engaged with the hub by means of a spring pawl 25 cooperating with ratchet teeth or notches 26 formed in the peripheral surface of the hub, so that the crank may be oscillated to effect an intermittent rotation of the tool spindle 10.

In applying the apparatus to its intended use, the support 1 is secured to the casing of the valve, the seat of which is to be resurfaced, by engaging the jaws 3 either exteriorly or interiorly of the valve casing, after the bonnet or cap portion carrying the valve has been removed, the parts being so adjusted that the support is firmly clamped to the valve casing with the tool spindle 10 normal or perpendicular to the valve seat to be resurfaced. The sleeve 5 is then adjusted longitudinally in the bore of the support 1 to bring the cutter or facing tool 11' in proximity to the valve seat. This adjustment of the sleeve 5 is effected by releasing the locking ring 7 from engagement with the particular groove 6' in the sleeve, by backing off the set screw 8 and allowing the spring ring to recede into the groove 7' formed in the inner face of the bore 1' of the support 1. This permits the sleeve 5 to be moved longitudinally of the bore in either direction and with it the tool spindle. After the sleeve 5 and the tool spindle carried thereby have been properly adjusted to bring the tool into proximate engagement with the seat of the valve to be recut, the sleeve 5 is locked to the support 1 by setting up the screw 8 and forcing the spring ring 7 into engagement with the particular groove 6 in the exterior face of the sleeve 5 which is then in registry with the groove 7' in the bore of the support. If none of the grooves 6 happen to be in registry with the groove 7, the spindle 5 is moved longitudinally in one direction or the other until the spring ring snaps into the nearest groove 6 after the screw 8 has been partially set up, the locking of the sleeve to the support 1 then being completed by fully setting up the screw 8. After the coarse adjustment of the cutting tool with respect to the valve seat has been effected, positive engagement of the tool 11' with the valve seat may be made by backing off the set nut 20 and turning the feed screw 18 by means of hand wheel 19, thereby forcing the tool spindle 10 longitudinally through the sleeve 5 until the cutting tool 11 is in contact with the valve seat. The tool spindle is then rotated either by the hand wheel 17 or by the crank 24 to effect the preliminary cut of the valve seat by the tool 11' and successive cuts may be taken by feeding the spindle 10 toward the work by turning the feed sleeve 18 in the proper direction by means of the hand wheel 19. The limit of each successive cut or of the entire cut may be regulated by adjusting the set nut 20 on the feed sleeve 18, so that when any one cut or the aggregate of several cuts have been effected, the set screw 20 will engage the upper end of the sleeve 5 and prevent further feed of the spindle by the feed sleeve 18, as the latter will be locked against rotation by the set nut 20.

It will be noted that the improved machine tool includes several structural and operative advantages, among which may be mentioned the long bearing between the sleeve 5 and the support 1, the longer bearing between the sleeve 5 and the tool spindle 10, which insures the maintenance of the spindle in all of its operations in exact perpendicularity with the valve seat to be resurfaced, the ready adjustability of the sleeve 5 longitudinally of the support 1 permits the cutter to be preliminarily adjusted with respect to the seats of valves of varying sizes quickly and accurately, after which the sleeve is securely locked to the support, and the particular feeding means interposed between the spindle 10 and the sleeve 5 admits of the proper and accurate feeding of the cutter to the work to effect the best results with certainty and accuracy, while the set nut 20 associated with the feed sleeve prevents too heavy a cut or series of cuts being taken, which would otherwise permanently impair the valve seat.

What I claim is:

1. A machine for facing valve seats comprising a support including means for securing the same to a valve casing, said support having an axial bore; a locking device carried by the support and adapted to be projected beyond the face of the axial bore; a sleeve slidably mounted in said bore, said sleeve having a threaded recess in its upper end and a series of recesses spaced longitudinally of its exterior surface and adapted to be brought individually into registry with said locking device; a tool spindle journaled and axially adjustable in said sleeve; a feed sleeve journaled on the upper end of said spindle and having threaded engagement with the recess in said sleeve; and means on the upper end of said spindle for rotating the same.

2. A machine for facing valve seats comprising a support including means for securing the same to a valve casing, said support having an axial bore; a locking device carried by the support and adapted to be projected beyond the face of the axial bore; a sleeve slidably mounted in said bore, said sleeve having a threaded recess at its upper end and a series of peripheral grooves on its exterior surface adapted to be brought individually into registry with the locking device; a tool spindle journaled and axially adjustable in said sleeve; a feed sleeve journaled on the upper end of said spindle and having threaded engagement with the recess in said sleeve; and means on the upper end of said spindle for rotating the same.

3. A machine for facing valve seats comprising a support including means for securing the same to a valve casing, said support having an axial bore provided with a circumferential groove therein; a sleeve slidably mounted in said bore, said sleeve having a threaded recess in its upper end and a series of circumferential grooves in its exterior surface adapted to be brought individually into registry with the groove in the bore of the support; locking means carried by the support and adapted to be engaged with the registering grooves to hold the sleeve in adjusted relation in the support; a tool spindle journaled and axially adjustable in said sleeve; a feed sleeve journaled on the upper end of said spindle and having threaded engagement with the recess in said sleeve; and means on the upper end of said spindle for rotating the same.

4. A machine for facing valve seats comprising a support including means for securing the same to a valve casing, said support having an axial bore provided with a circumferential groove therein; a sleeve slidably mounted in said bore, said sleeve having a threaded recess in its upper end and a series of circumferential grooves in its exterior surface adapted to be brought individually into registry with the groove in the bore of the support; a spring ring normally lying within the groove in the support; means carried by the support for projecting the spring ring to engage any groove on the sleeve registering with the groove in the support; a tool spindle journaled and axially adjustable in said sleeve; a feed sleeve journaled on the upper end of said spindle and having threaded engagement with the recess in said sleeve; and means on the upper end of said spindle for rotating the same.

In testimony whereof I affix my signature.

LEON H. ROGERS.